2,956,959
POLYMERIZATION OF EPOXY COMPOUNDS

Clyde V. Detter, Bartlesville, Okla., assignor to Phillips Petroleum Company, a corporation of Delaware No Drawing. Filed June 23, 1958, Ser. No. 743,970

10 Claims. (Cl. 260—2)

This invention relates to a process for the production of polymers of epoxy compounds. In one aspect, it relates to a process for polymerizing alpha-alkylene oxides to liquid and solid polymers and to a novel catalyst therefor.

Various materials are disclosed in the literature for polymerizing ethylene oxide to products ranging from liquid to wax-like polymers. In the case of propylene oxide, the methods described, in general, produce liquid rather than solid products. The instant invention is concerned with a process whereby liquid and solid polymers of an alpha-alkylene oxide, such as propylene oxide, are produced.

It is an object of this invention to provide a novel process for producing liquid and solid polymers of epoxy compounds.

Another object of the invention is to provide a novel catalyst system for use in the polymerization of epoxy compounds.

A further object of the invention is to provide a novel process for polymerizing propylene oxide to a solid polymer.

Other and further objects and advantages of the invention will become apparent to those skilled in the art upon consideration of the accompanying disclosure.

The instant invention resides in the discovery of a process whereby liquid and solid polymers of epoxy compounds can be obtained. Broadly speaking, the process comprises contacting an epoxy compound with a catalyst comprising an organo compound of a metal of group IV-A of the periodic table, the contacting preferably occurring in the presence of an inert diluent. It is also within the scope of the invention to employ in conjunction with the group IV-A metal compound a small amount of an inorganic acid, such as hydrochloric acid.

The organo compounds of group IV-A metals utilized as the catalyst in the practice of the instant invention can be represented by the general formula $M(OR)_4$. In this formula, M is a metal selected from the group consisting of titanium, zirconium, hafnium and thorium while R is a radical selected from the group consisting of alkyl, alkenyl, cycloalkyl, cycloalkenyl, and aryl. It is to be understood, also that the R in the formula can be combinations of the aforementioned radicals, e.g., an alkaryl, an aralkyl, or a cycloalkylalkyl radical. Each of the aforementioned hydrocarbon radicals may contain up to about 20 carbon atoms, preferably from 1 to 10, inclusive, carbon atoms, with the total number of carbon atoms in the compound not exceeding about 52. Mixtures of any two or more of the metal compounds can be employed in the practice of this invention. Examples of the specific compounds which can be employed include titanium butoxide (tetra-n-butyl titanate), tetra-sec-butyl titanate, tetraisopropyl titanate, tetra-2-ethylbutyl titanate, tetra-2-ethylhexyl titanate, tetratridecyl titanate, tetraethyl titanate, tetralauryl titanate, diethyldieicosyl titanate, tetra-n-tolyl titanate, tetraallyl titanate, dicyclohexyldiethyl titanate, tetracyclohexenyl titanate, tetracyclopentyl titanate, tetraethyl zirconate, tetramethyl zirconate, tetraisopropyl zirconate, tetraamyl zirconate, and the like. Also included are such compounds as $Hf(OCH_3)_4$, $Hf(OC_3H_7)_4$, $Hf(OC_6H_5)_4$, $Th(OC_6H_{13})_4$, $Th(OC_{12}H_{25})_4$, $Th(OC_4H_7)_4$, and the like. Of the Group IV-A metal compounds listed hereinabove, it is preferred to utilize titanium butoxide in the process of this invention.

The process of this invention is carried out in the presence of an inert diluent which does not inactivate or otherwise have a deleterious effect on the group IV-A metal compound. It is preferred to utilize a hydrocarbon diluent such as one selected from the group consisting of paraffins, cycloparaffins and aromatic hydrocarbons, which is liquid under conditions of the process. Examples of suitable hydrocarbon diluents include benzene, toluene, xylene, ethylbenzene, isobutane, n-pentane, isooctane, n-decane, cyclopentane, methylcyclopentane, dimethylcyclopentane, ethylcyclopentane, cyclohexane, methylcyclohexane, dimethylcyclohexane, and the like. Mixtures of these solvents can also be employed in the process. It is also in the scope of the invention to use as the diluent other materials which are inert under the conditions of the process. For example, ethers, such as dimethyl ethyl methyl ether, ethylmethyl ether, ethyl propyl ether, di-n-propyl ether, and diisopropyl ether, can be advantageously utilized. In general, approximately equal amounts of the diluent and the epoxy compound are used in the process, although greater and smaller amounts of the diluent can be used.

The amount of the group IV-A metal compound which is employed in the polymerization of the epoxy compounds can vary over a rather wide range. In general, the amount should be at least 0.02 part per 100 parts of the epoxy compound to be polymerized, both amounts being on a weight basis. It is usually preferred to utilize an amount in the range of 0.02 to 2 parts by weight of the group IV-A metal compound per 100 parts by weight of the total monomer charged.

When carrying out the process of this invention as described hereinabove by contacting an epoxy compound with the group IV-A metal compound, the product formed is a liquid polymer of the epoxy compound. It has also been discovered that solid polymers of the epoxy compounds can be formed if the contacting occurs in the presence of a small amount of water. The ratio of the amount of group IV-A metal compound to water on a weight basis is usually in the range of 10:1 to 1:5, preferably in the range of 6:1 to 2:1.

While the instant invention is broadly applicable to the polymerization of epoxy compounds, it is preferred to utilize alpha-alkylene oxides in the practice of this invention. Of the alpha-alkylene oxides, it is preferred to employ those containing from 2 to 8 carbon atoms per molecule. Examples of such compounds include ethylene oxide, propylene oxide (1,2-epoxypropane), alpha-isobutylene oxide (1,2-epoxy-2-methyl-propane), alpha-n-butylene oxide (1,2-epoxy-n-butane), 1,2-epoxy-n-hexane, 1,2-epoxy-n-octane, and 4,4,2-trimethyl-1,2-epoxypentane.

In a preferred embodiment for conducting the process of this invention, the catalyst comprising a group IV-A metal compound and the inert diluent are initially added to a reaction vessel in any desired order. As mentioned hereinbefore, it is usually preferred to utilize a hydrocarbon diluent since the group IV-A metal compound readily goes into solution in such a material. The epoxy compound to be polymerized is then added to the reaction vessel, and this material also readily goes into solution in the inert diluent. The product formed when proceeding in this manner is a liquid polymer.

When it is desired to form solid polymer, the cocatalyst water is added to the reaction mixture contained in the reaction vessel, i.e., the inert diluent, the group IV-A metal compound and the epoxy compound. It has been discovered that it is necessary in order to form solid polymer that the materials be added to the reaction vessel in a manner such that the water will not be in contact with the group IV-A metal compound for any substantial period of time prior to the charging of the epoxy compound. No solid polymer is formed if the water is permitted to contact the group IV-A metal compound for any length of time prior to the addition of the epoxy compound. However, it is to be understood that the epoxy compound and the water can be charged substantially simultaneously to the reactor containing diluent and catalyst, or the water can be added immediately after the epoxy compound is charged. Furthermore, solid polymer can be formed by initially introducing the diluent, epoxy compound and water into the reactor, after which the group IV-A metal compound is added.

The polymerization temperature can vary over a rather wide range, e.g., from 10 to 100° C.; however, it is preferred to operate at a temperature in the range of about 30 to 60° C. In a preferred method of operation, heat is applied to the reaction vessel in an amount sufficient to cause refluxing of the reaction mixture. The reaction time can also vary over rather broad limits such as from about 1 hour to 100 hours or more. The pressure used during the polymerization reaction can vary from atmospheric and below to 500 p.s.i.g. and higher. It is usually preferred to operate at a pressure such that the reaction mixture is maintained substantially in the liquid phase.

Upon completion of the polymerization, the polymer is then separated from the reaction mixture by any suitable method. In one method, the reaction mixture is heated so as to distill off the diluent, leaving liquid polymer and, when the cocatalyst water is used, solid polymer. The solid polymer can be readily separated from the liquid polymer by any suitable separation method, such as filtration or decantation. It is also within the scope of the invention to separate, e.g., by filtration, the solid polymer from the total reaction mixture and thereafter boil off the diluent so as to recover the liquid polymer. This latter recovery method is particularly applicable when using diluents, such as paraffins and cycloparaffins, in which the solid polymer is insoluble. However, if aromatic hydrocarbons in which the solid polymer is somewhat soluble are utilized in the process, it then becomes desirable to proceed in accordance with the first-mentioned recovery method by distilling off the diluent from the total reaction mixture and thereafter separating the solid from the liquid polymer.

The polymer product recovered from the reaction zone contains a small amount of catalyst residues principally in the form of titanium oxide. The amount of catalyst contained in the polymer is very small and in most cases need not be removed from the polymer. However, removal of the catalyst can be readily accomplished by filtration in the case of the liquid polymer. In the case of the solid polymer, the catalyst can be removed by dissolving the polymer in a suitable solvent, such as paraxylene, and then filtering the polymer solution. The filtrate recovered, which is substantially free of catalyst residues, can then be cooled so as to precipitate the polymer which can be then separated by filtration.

A more comprehensive understanding of the invention can be obtained by referring to the following illustrative examples, which are not intended, however, to be unduly limitative of the invention.

EXAMPLE I

A series of runs was carried out in which propylene oxide was polymerized to liquid and solid polymers.

In the runs carried out according to the invention, titanium butoxide was charged to a 500 cc., 3-necked, resin flask provided with a mechanically operated stirrer and a reflux condenser. The flask into which the titanium butoxide was introduced contained the inert diluent, and thereafter the propylene oxide was added to the flask. After the addition of the propylene oxide, water when used was added to the reaction mixture, i.e., the inert diluent, titanium butoxide and propylene oxide. After the reactants had been added to the flask, the flask was heated. The reaction conditions and the diluents used in the runs as well as the results of the runs are set forth hereinbelow in Table I. In certain of the runs as shown in the table, the above-described procedure was modified by omitting the addition of water, by using aqueous hydrochloric acid instead of water, or by varying the order of addition of the reactant materials. The solid polymer when obtained was separated from the reaction mixture by filtration and dried in a vacuum oven. An infrared analysis of the polymer from run 1 indicated that polypropylene oxide was produced.

It is seen from an examination of Table I that liquid and solid polymers of propylene oxide are produced when proceeding in accordance with this invention. In runs 1, 2 and 7 in which the cocatalyst water was charged according to the procedure of this invention, liquid and solid polymers were formed. When no water was used, as in runs 1, 5 and 6, liquid polymer only was produced. As shown by run 4, liquid polymer was also formed when an inorganic acid, such as hydrochloric acid, was used with the catalyst. Run 3 shows that when the cocatalyst water was not added according to the procedure of this invention, only 0.1 gram of solid polymer was obtained.

*Table I*

| Run No. | 1 | 2 | 3 | 4 | 5 | 6 | 7 |
|---|---|---|---|---|---|---|---|
| Titanium butoxide, ml | 5 | 5 | 5 | 5 | 5 | 5 | 5. |
| Cocatalyst | Water | Water | Water [1] | HCL [2] | None | None | Water. |
| Amount of Cocatalyst, ml | 1 | 12 | 1.5 | 5 | | | 0.4. |
| Temperature, ° C | 45–70 | Room | Room | 54 | 156 | 198 | 100. |
| Reaction Time, Hours | 1 | 3 | 2 | 8.5 | 6 | 5.3 | 4. |
| Amt. Propylene Oxide, ml | 100 | 100 | 25 | 50 | 100 | 50 | 50. |
| Diluent | Cyclohexane | Cyclohexane | Cyclohexane | Cyclohexane | Isooctane | Isooctane | Isooctane. |
| Amt. Diluent, ml | 200 | 290 | 400 | 260 | 250 | 250 | 250. |
| Liquid Polymer, ml.[3] | 19 | 3 | Not measured | 10 | 8 | 20 | Not measured. |
| Solid Polymer, gms | 1.7 | 1.6 | 0.1 | 0 | .08 | 0 | 0.8. |

[1] Added to flask containing titanium butoxide before addition of diluent and propylene oxide.
[2] Aqueous HCl.
[3] Determined by distilling off the diluent after separation of any solid polymer and measuring the volume of the kettle product.

EXAMPLE II

Another series of runs was carried out in order to determine the optimum amount of the cocatalyst to use when preparing solid polymer. The diluent, catalyst, and propylene oxide were initially charged in that order to a flask as described in Example I, after which the water was added. In these runs, the amount of water added to the flask was varied, and the duration of each run was 2 hours. The runs were carried out at about 45° C., the temperature at which the propylene oxide refluxed, and at atmospheric pressure. In each of the runs, 50 ml. of propylene oxide and 100 ml. of isooctane (diluent) were used. The results of the runs are shown herebelow in Table II.

Table II

| Run No. | 9 | 10 | 11 | 12 | 13 |
|---|---|---|---|---|---|
| Titanium butoxide, ml | 2 | 2 | 2 | 2 | 2 |
| Water, ml | 0.2 | 0.5 | 1 | 2 | 10 |
| Ratio titanium butoxide to water | 10:1 | 4:1 | 2:1 | 1:1 | 1:5 |
| Solid polymer, gms | 0.51 | 1.64 | 0.69 | 0.50 | 0.71 |
| Liquid Polymer | (1) | (1) | (1) | (1) | (1) |

[1] Not measured.

It is seen from an examination of Table II that a titanium butoxide to water ratio of 4 to 1 gave the highest yield of solid polymer per gram of titanium butoxide.

The products produced in accordance with this invention are liquid and solid polymers which are usually colorless or white. The solid polymers have a variety of applications and are particularly useful in forming films having desirable properties of flexibility, tensile strength, and resistance to tear. They can also be employed in the manufacture of molded objects. The liquid polymers have utility as transformer oils or high pressure fluids. It is usually desirable to incorporate an antioxidant into the polymer in order to prevent its oxidation. The antioxidant can be added to the reaction mixture during its preparation, or it can be added during a molding operation. The antioxidants which can be used with rubber, such as phenyl-beta-naphthylamine, can be advantageously employed with the polymers of this invention.

As will be evident to those skilled in the art, many variations and modifications of the invention can be practiced upon consideration of the foregoing disclosure. Such variations and modifications are believed to be within the spirit and scope of the invention.

I claim:

1. A process for polymerizing a 1,2-epoxy-alkane containing from 2 to 8, inclusive, carbon atoms per molecule which comprises contacting said 1,2-epoxy-alkane with a catalyst comprising a compound corresponding to the formula M(OR)$_4$, wherein M is a metal selected from the group consisting of titanium, zirconium, hafnium and thorium, and R is a radical selected from the group consisting of alkyl, alkenyl, cycloalkyl, cycloalkenyl and aryl, said contacting occurring in the presence of an inert liquid diluent.

2. A process for polymerizing a 1,2-epoxy-alkane containing from 2 to 8, inclusive, carbon atoms per molecule which comprises charging to a reaction zone an inert liquid diluent, said 1,2-epoxy-alkane, and a catalyst comprising a compound corresponding to the formula M(OR)$_4$, wherein M is a metal selected from the group consisting of titanium, zirconium, hafnium, and thorium, and R is a radical selected from the group consisting of alkyl, alkenyl, cycloalkyl, cycloalkenyl and aryl; introducing water into said reaction zone; and recovering the polymer so produced.

3. The process according to claim 2 in which the amount of said catalyst charged to said reaction zone is in the range 0.02 to 2 parts by weight of said catalyst per 100 parts by weight of said aliphatic 1,2-epoxyalkane, and the ratio of the amount of said catalyst to water on a weight basis is in the range of 10:1 to 1:5.

4. The process according to claim 2 in which said inert liquid diluent is a hydrocarbon selected from the group consisting of paraffinic, cycloparaffinic and aromatic hydrocarbons.

5. The process according to claim 2 in which said reaction zone is maintained at a temperature in the range of 10 to 100° C.

6. A process for polymerizing propylene oxide to liquid and solid polymers which comprises charging to a reaction zone (1) a liquid hydrocarbon selected from the group consisting of paraffinic, cycloparaffinic and aromatic hydrocarbons, (2) a catalyst consisting essentially of titanium butoxide, and (3) propylene oxide, the amount of said titanium butoxide being in the range of 0.02 to 2 parts by weight per 100 parts by weight of said propylene oxide; introducing water into said reaction zone containing liquid hydrocarbon, said catalyst and said propylene oxide, the ratio of the amount of said titanium butoxide to water on a weight basis being in the range of 6:1 to 2:1; maintaining said reaction zone at a temperature in the range of about 30 to 60° C. and at a pressure from about atmospheric to about 500 p.s.i.g.; and recovering the liquid and solid polymers of propylene oxide so produced.

7. The process according to claim 6 in which said liquid hydrocarbon is cyclohexane.

8. The process according to claim 6 in which said liquid hydrocarbon is isooctane.

9. A process for polymerizing ethylene oxide which comprises contacting said ethylene oxide with a catalyst comprising a compound corresponding to the formula M(OR)$_4$, wherein M is a metal selected from the group consisting of titanium, zirconium, hafnium and thorium, and R is a radical selected from the group consisting of alkyl, alkenyl, cycloalkyl, cycloalkenyl and aryl, said contacting occurring in the presence of an inert liquid diluent.

10. A process for polymerizing propylene oxide which comprises contacting said propylene oxide with a catalyst comprising a compound corresponding to the formula M(OR)$_4$, wherein M is a metal selected from the group consisting of titanium, zirconium, hafnium and thorium, and R is a radical selected from the group consisting of alkyl, alkenyl, cycloalkyl, cycloalkenyl and aryl, said contacting occurring in the presence of an inert liquid diluent.

No references cited.